United States Patent
Pasca

(10) Patent No.: US 9,927,627 B2
(45) Date of Patent: Mar. 27, 2018

(54) LAYERED GLASS ASSEMBLY FOR OPTICAL LIGHT BEAM PROJECTION WITH 3D EFFECTS ON SEAMLESS SURFACES

(71) Applicant: Andrei Pasca, Timisoara (RO)

(72) Inventor: Andrei Pasca, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 50 days.

(21) Appl. No.: 15/078,660

(22) Filed: Mar. 23, 2016

(65) Prior Publication Data

US 2016/0282632 A1  Sep. 29, 2016

(30) Foreign Application Priority Data

Mar. 24, 2015 (EP) .................................. 15465506

(51) Int. Cl.
- *G02B 1/10* (2015.01)
- *G02B 27/22* (2018.01)
- *B60K 35/00* (2006.01)

(52) U.S. Cl.
CPC .......... *G02B 27/2221* (2013.01); *B60K 35/00* (2013.01); *B60K 2350/2017* (2013.01)

(58) Field of Classification Search
CPC ............................................... G02B 27/2221
USPC ........ 359/479, 454–458, 546, 603, 609, 586
See application file for complete search history.

(56) References Cited

U.S. PATENT DOCUMENTS

| | | | |
|---|---|---|---|
| 3,053,135 A * | 9/1962 | Tanaka | G02B 27/2221 352/86 |
| 5,113,272 A | 5/1992 | Reamey | |
| 6,721,023 B1 | 4/2004 | Weiss et al. | |
| 2007/0268580 A1* | 11/2007 | Biebel | G02B 27/2221 359/479 |
| 2014/0009834 A1* | 1/2014 | Kalyankar | G02B 1/115 359/586 |

FOREIGN PATENT DOCUMENTS

EP  1 950 725  7/2008

* cited by examiner

*Primary Examiner* — Audrey Y Chang
(74) *Attorney, Agent, or Firm* — Cozen O'Connor

(57) ABSTRACT

A layered glass assembly for optical light beam projection with three-dimensional depth perception for a vehicle includes: a display surface glass having a first refractive index and being configured to refract a first section of a light beam at a first interface; a first transition structure configured to refract a second section of the light beam at a second interface; a filler structure having a second refractive index and being configured to refract a third section of the light beam at a third interface; a second transition structure configured to refract a fourth section of the light beam at a fourth interface; and a front glass having a third refractive index and being configured to project the refracted light beam so as to generate the three-dimensional depth perception.

17 Claims, 7 Drawing Sheets

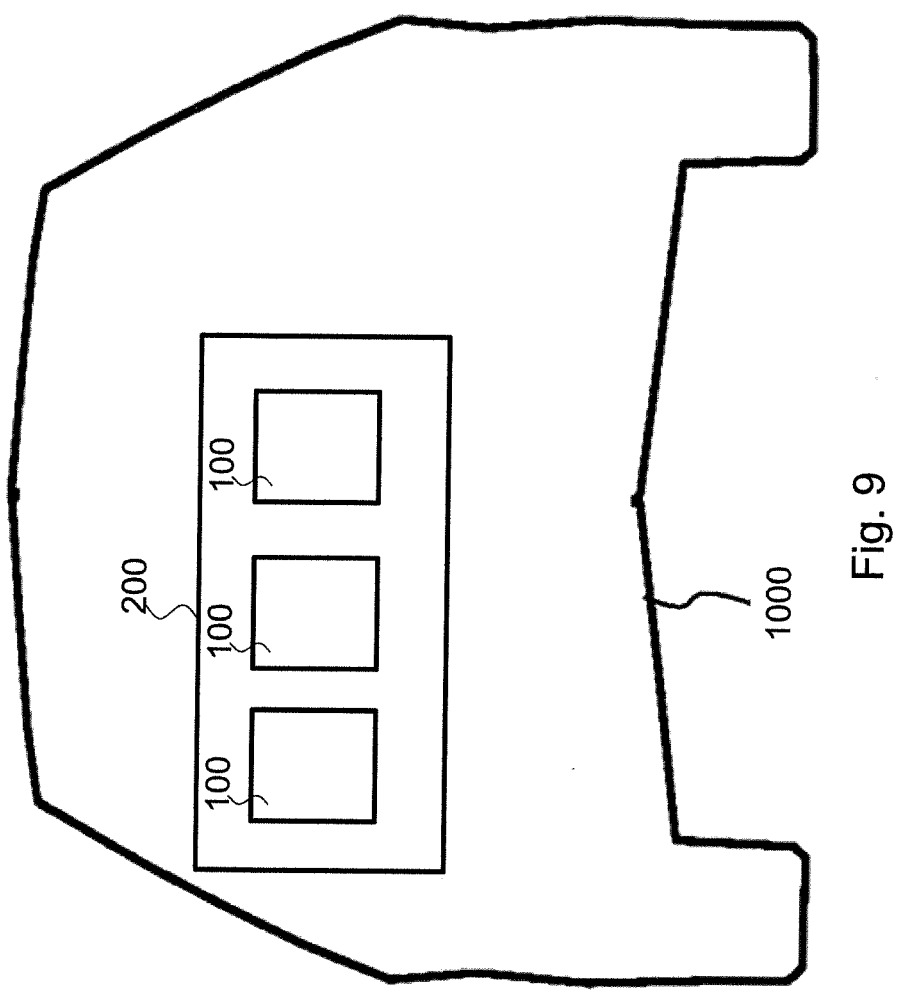

LAYERED GLASS ASSEMBLY FOR OPTICAL LIGHT BEAM PROJECTION WITH 3D EFFECTS ON SEAMLESS SURFACES

BACKGROUND OF THE INVENTION

1. Field of the Invention

The present invention relates to the field of three-dimensional effects on flat displays.

2. Description of the Related Art

There are technical fields that require the use of seamless, smooth surfaces, for instance flat or curved surfaces, and, at the same time, require the use of fixed or stationary three-dimensional image effects, over a wide field of view, both at a relatively low price. For instance, this can be a glass vehicle cockpit where the external, visible surface is in line with the rest of the interior design.

Known glasses-free three-dimensional displays have a limited viewing angle in which the three-dimensional effect is maintained at a good quality level.

There may be a need to improve displays providing a three-dimensional projection.

SUMMARY OF THE INVENTION

It is an object of the present invention to solve deficiencies of the prior art. In particular, in accordance with this object, there is provided a layered glass assembly for optical light beam projection with three-dimensional depth perception for a vehicle and an electronic instrument comprising the layered glass assembly, and a method for producing a layered glass assembly.

A first aspect of the present invention relates to a layered glass assembly for optical light beam projection with three-dimensional depth perception for a vehicle, the layered structure comprising: a display surface glass, which comprises a first refractive index and which is configured to refract a first section of a light beam at a first interface; a first transition structure configured to refract a second section of the light beam at a second interface; a filler structure, which comprises a second refractive index and which is configured to refract a third section of the light beam at a third interface; a second transition structure configured to refract a fourth section of the light beam at a fourth interface; and a front glass, which comprises a third refractive index and which is configured to project the refracted light beam generating the three-dimensional depth perception.

The embodiments of the present invention advantageously allow for creating realistic three-dimensional effects while maintaining the seamless, smooth appearance of the front surface of the device with the aid of a modified optical bonding approach.

The embodiments of the present invention advantageously provide the ability to hide from view the optically shaped surfaces. To achieve seamless integration, reflections at the interfaces between different materials must be reduced. The embodiments of the present invention advantageously achieve the reduction of reflections by using a layered structure for the filling material.

In order to observe lens effects and therefore also three-dimensional effects, it is provided that the filler material between the active surface and the front glass has a refractive index different than that of the active surface and the front glass.

According to a further, second aspect of the present invention, an electronic instrument is provided comprising a layered glass assembly according to the first aspect or according to any implementation form of the first aspect.

According to a further, third aspect of the present invention, a vehicle is provided, comprising an electronic instrument according to the second aspect of the present invention or according to any implementation form of the second aspect of the present invention.

According to a further, fourth aspect of the present invention, a method for producing a layered glass assembly is provided, the method comprising the steps of: providing a display surface glass, a first transition structure, a filler structure, a second transition structure, and a front glass; and assembling the display surface glass, the first transition structure, the filler structure, the second transition structure, and the front glass to form the layered glass assembly.

According to a further exemplary embodiment of the present invention, the front glass is shaped with raised or sunken area portions or with a relief structure. This advantageously provides that a three-dimensional depth perception is achieved.

According to a further exemplary embodiment of the present invention, the display surface glass is shaped with raised or sunken area portions or with a relief structure. This advantageously provides that a three-dimensional depth perception is achieved.

According to a further exemplary embodiment of the present invention, the filler structure is configured to fill the gap between the display surface glass and the front glass.

According to a further exemplary embodiment of the present invention, the first optical refractive index of the display surface glass is differing from the third optical refractive index of the front glass by 15%, preferably by 10%, more preferably by 5%, even more preferably by 2%.

According to an exemplary embodiment of the present invention, the second optical refractive index of the filler structure is larger than 1.2 times the first optical refractive index of the display surface glass and/or larger than 1.2 times the third optical refractive index of the front glass, preferably larger than 1.5 times, more preferably larger than 1.7 times, even more preferably larger than 2 times, yet even more preferably larger than 2.5 times.

According to an exemplary embodiment of the present invention, the first transition structure comprises a layered structure of at least two layers, wherein the layer adjacent to the display surface glass comprises the lowest refractive index of the layered structure and the layer adjacent to the filler structure comprises the highest refractive index of the layered structure.

According to an exemplary embodiment of the present invention, the second transition structure comprises a layered structure of at least two layers, wherein the layer adjacent to the front glass comprises the lowest refractive index of the layered structure and the layer adjacent to the filler structure comprises the highest refractive index of the layered structure.

According to an exemplary embodiment of the present invention, if analyzed from the display surface towards the front glass, the refractive index of the layers increases in the upward direction until it reaches a maximum value in the bulk of the filler material. After this maximum value is reached, a reverse order of refractive indices is used, resulting in a decrease, layer by layer, until the front plate surface is reached. The refractive indices of each layer are chosen so that there is only a minor difference between two consecutive layers.

According to an exemplary embodiment of the present invention, the layered glass assembly is configured to display a speed of the vehicle, an engine rotational speed, a vehicle parameter, a driving status of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

A more complete appreciation of the present invention and the advantages thereof will be more clearly understood by reference to the following schematic drawings, which are not to scale. In the drawings:

FIG. 9 shows a schematic diagram of a vehicle according to an exemplary embodiment of the present invention.

DETAILED DESCRIPTION OF THE PRESENTLY PREFERRED EMBODIMENTS

Figure 1:
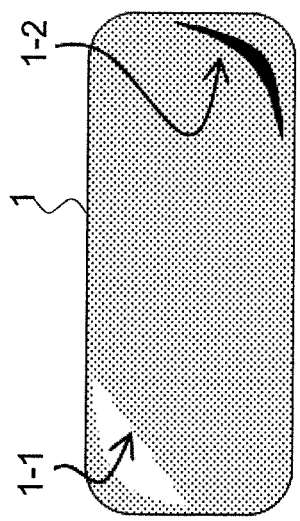
FIG. 1 shows an image of a displayed object for explaining the present invention.

The illustration in the drawings is purely schematic and is not intended to provide scaling relations or size information.

In different drawings or figures, similar or identical elements may be provided with the same reference numerals. Generally, identical parts, units, entities or steps are provided with the same reference symbols in the description.

For the present patent application, the word "glass" must not be restricted only to glass materials and may be understood as any clear or transparent material that can fulfill the mechanical and optical requirements for the layered assembly.

While the present invention has been illustrated using only flat front glass surfaces, it should be clear to those skilled in the art that the current invention can be applied even if the surface has a different geometry.

In case the front glass already has a geometric shape that would produce optical effects even in the prior art, the present invention can still be used either to add new effects, enhance the already existing effects or even to cancel the existing effects.

FIG. 1 shows a schematic diagram of an object for explaining the present invention.

FIG. 1 shows a light area that emulates the effect of lighting on a three-dimensional object, a two-dimensional, but enlightened area 1-1 is present on the object 1. Further, a further two-dimensional, but darkened area 1-2 is present that emulates the shadows of the object 1.

As can be seen in FIG. 1, two-dimensional graphics are used that emulate a three-dimensional effect for the object 1. In this way, at a first glance, the image of the object 1 appears to have a three-dimensional effect while being completely two-dimensional.

The three-dimensional effects as provided are limited with respect to the areas or viewing angles and do not change over time.

Figure 2:
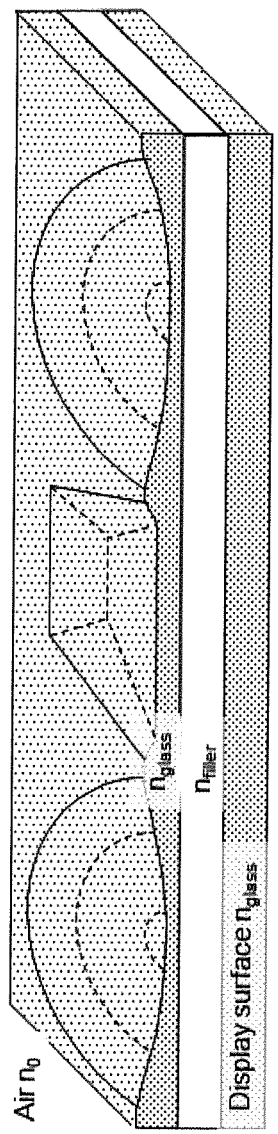
FIG. 2 shows a schematic diagram of a glass layer assembly for explaining the present invention.

FIG. 2 shows a schematic diagram of a glass layer assembly for explaining the present invention, the optical system as seen in FIG. 2 comprises a visible surface, which is shaped in such a way as to act as lenses.

Differences between the displays, refractive index, the bonding material, and the front glass are minimized in order to avoid reflections on the transition regions.

However, if classical optical bonding is applied, the optical system cannot be really hidden from view. As seen in FIG. 2, the visible surface of the system is modelled in such a way as to act as lenses. This is so because, for optical bonding, the differences between the display's refractive index, bonding material refractive index and the front glass or optical system refractive index are minimized in order to avoid spurious reflections on the transition regions.

Figure 3:
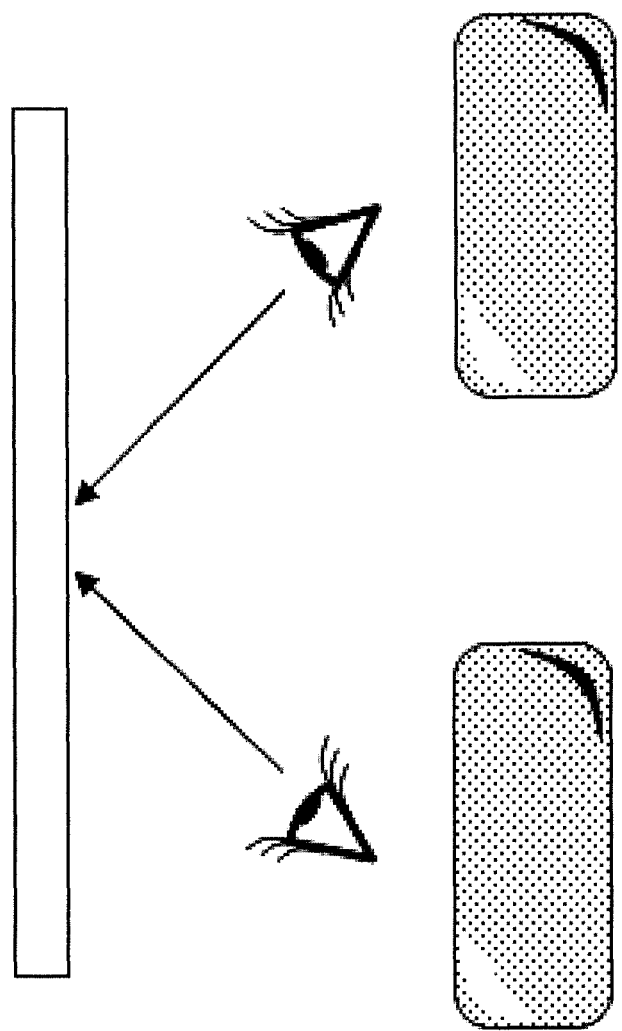
FIG. 3 shows an emulation of a three-dimensional effect by using two-dimensional graphics for explaining the present invention.

FIG. 3 shows an optical system for explaining the present invention. As shown in FIG. 3, emulated three-dimensional effects that are emulated by using two-dimensional graphics do not comprise a parallax effect—meaning that when the position of the viewer is shifted, the image remains unchanged. This translates in an immediate dismissal of the three-dimensional effect by the end user who becomes aware that the three-dimensional effect is emulated.

Figure 4:
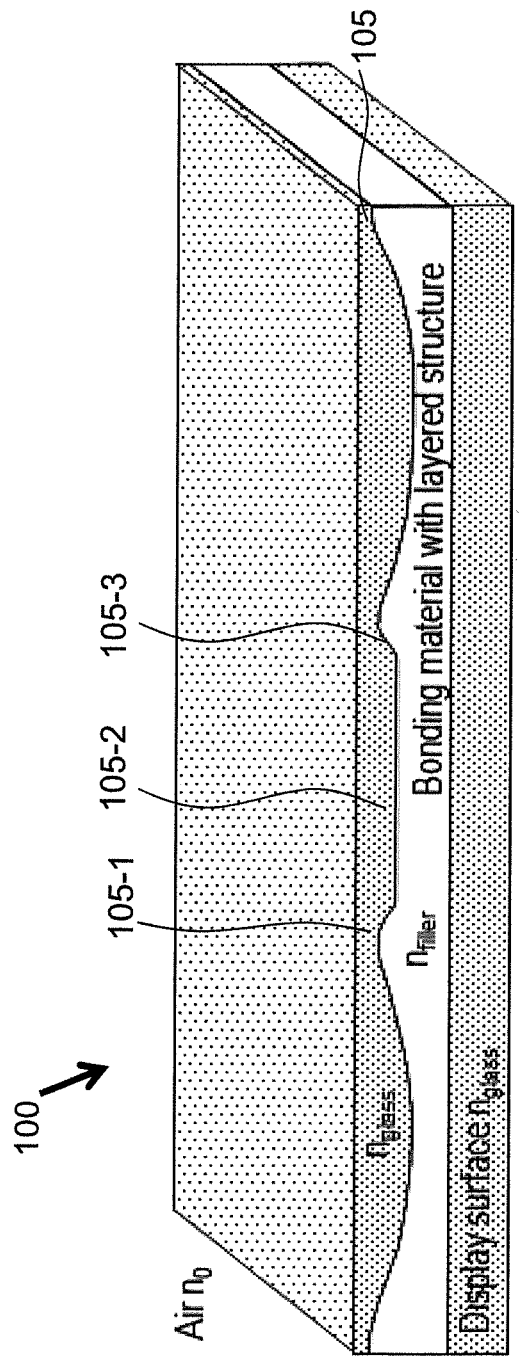
FIG. 4 shows a schematic diagram of a glass layer assembly according to an exemplary embodiment of the present invention.

FIG. 4 shows a glass layer assembly according to an exemplary embodiment of the present invention.

A way of hiding from view the optically shaped surfaces is to have them placed on the interior face of the front glass in an optically bonded surface, as seen in FIG. 4. A bonding material with the same or similar refractive index as the front glass results in no optical effect.

In order to observe lens effects and hence three-dimensional effects, it is required that the filler material between the active surface and the front glass has a refractive index different from the active surface and the front glass.

The front glass 105 of the glass layer assembly 100 is shaped with raised or sunken area portions 105-1, 105-2, 105-3 or a relief structure.

Figure 5:
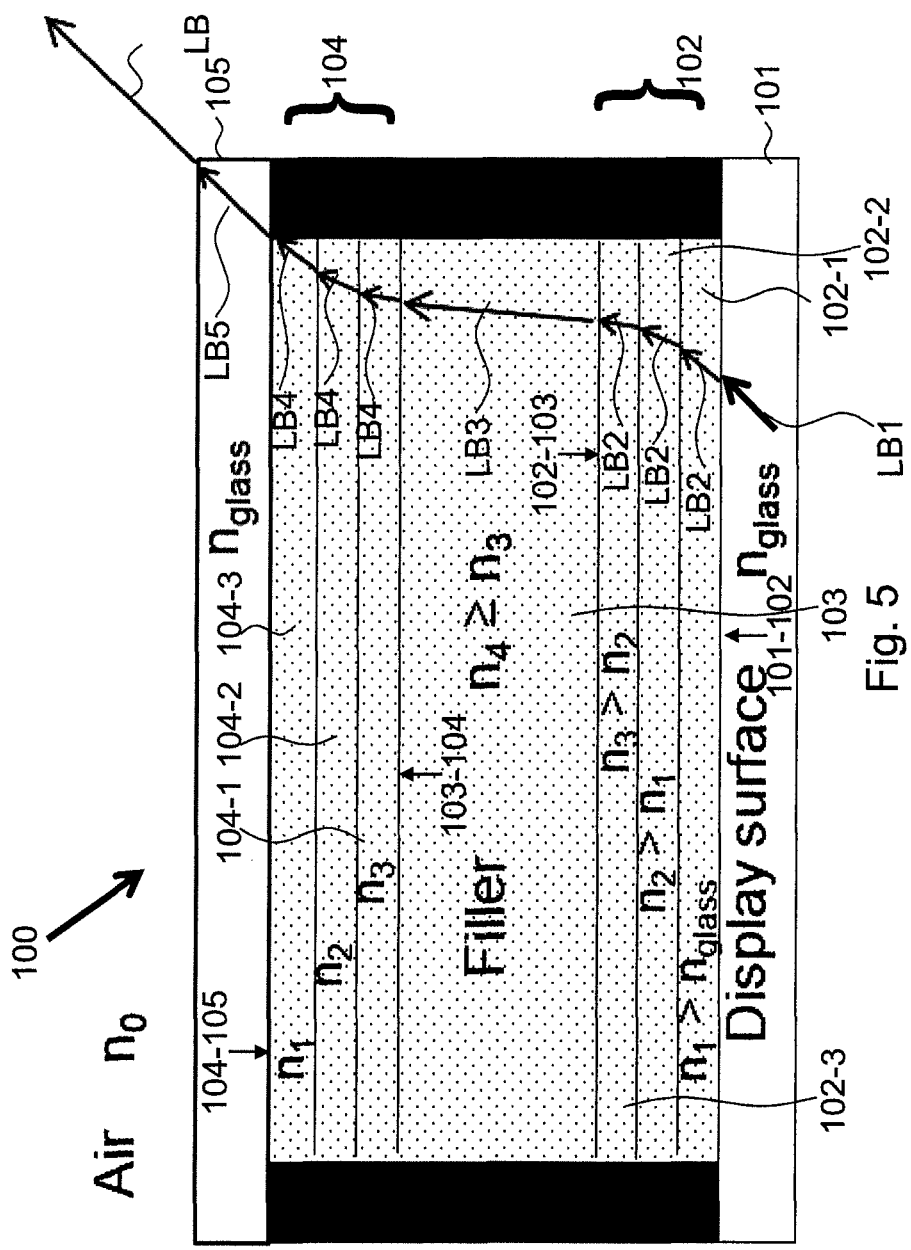
FIG. 5 shows a schematic diagram of a glass layer assembly according to an exemplary embodiment of the present invention.

FIG. 5 shows a schematic diagram of a glass layer assembly according to an exemplary embodiment of the present invention.

A layered glass assembly 100 for optical light beam projection with three-dimensional depth perception for a vehicle comprises: a display surface glass 101, a first transition structure 102, a filler structure 103, a second transition structure 104, and a front glass 105.

The display surface glass 101 comprises a first refractive index and is configured to refract a first section LB-1 of a light beam LB at a first interface 101-102.

The first transition structure 102 is configured to refract a second section LB-2 of the light beam LB at a second interface 102-103.

The filler structure 103 comprises a second refractive index and which is configured to refract a third section LB-3 of the light beam LB at a third interface 103-104.

The second transition structure 104 is configured to refract a fourth section LB-4 of the light beam LB at a fourth Interface 104-105

The front glass 105 comprises a third refractive index and is configured to project the refracted light beam LB generating the three-dimensional depth perception.

In order to achieve seamless integration, spurious reflections may be reduced at the interfaces between different materials. This can be achieved by using a layered structure for the filler material 103 as seen in FIG. 5.

According to FIG. 5, if analyzed from the display surface towards the front glass 105, it is apparent that the refractive index of the layers increases in the upward direction until it reaches a maximum value in the bulk of the filler material 103. After this maximum value is reached, the reverse order of refractive indices is used, resulting in a decrease, layer by layer, until the front plate surface is reached, e.g., until the front glass 105 is reached.

The refractive indices of each layer are chosen so that there is only a minor difference between two consecutive layers.

Using the number of layers as shown in FIG. 5 and assuming the refractive index of the glass material to be 1.5 and that of the bulk filler material to be n4=2, the consecutive refractive indices may be 1.625, 1.75 and 1.875, for instance.

The number of layers and the effective values of the refractive indices can be adapted to different requirements. The notations of FIG. 5 are only for illustration purposes and may not be understood as a restriction for the refractive indices of the top and bottom transition layers, i.e., it is not required that the lowermost layer has the same refractive index in $n\_1$ as the topmost transition layer.

In order to create a three-dimensional effect, the material with the largest refractive index forms the bulk of the filler material 103. The filler material 103 may be placed between the image generating surface and the front plate. The thickness of the rest of the filler material may be adjusted to any value and may be, for instance, minimized.

Figure 6:
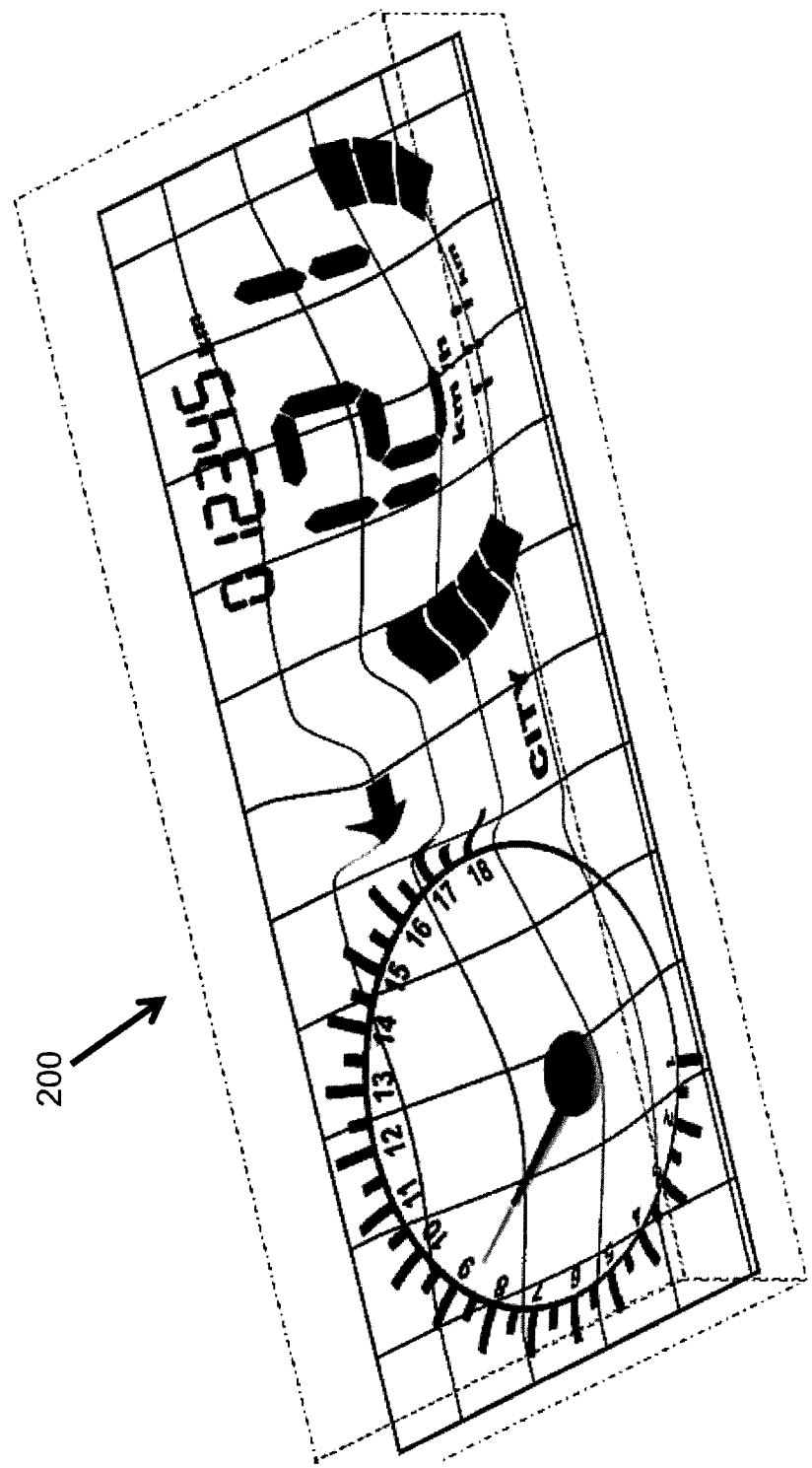
FIG. 6 shows a schematic diagram of an electronic instrument according to an exemplary embodiment of the present invention.

FIG. 6 shows a schematic diagram of an electronic instrument according to an exemplary embodiment of the present invention.

FIG. 6 shows an exemplary embodiment of the present invention: inside a car cockpit where it can be applied to a full-display instrument cluster, e.g., the electronic instrument 200, that will produce an image as depicted in FIG. 6.

In the depiction of FIG. 6, it can be seen that the front surface of the instrument cluster is a smooth flat surface while the three-dimensional image is generated in the bulk of the electronic instrument 200.

Figure 7:
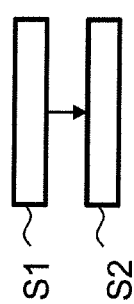
FIG. 7 shows a schematic diagram of a flowchart diagram of a method for producing a layered glass assembly according to an exemplary embodiment of the present invention.

FIG. 7 shows a schematic diagram of a flowchart diagram of a method for producing a layered glass assembly according to an exemplary embodiment of the present invention.

As a first step of the method, providing S1 a display surface glass 101, a first transition structure 102, a filler structure 103, a second transition structure 104, and a front glass 105 is conducted.

As a second step of the method, assembling S2 the display surface glass 101, the first transition structure 102, the filler structure 103, the second transition structure 104, and the front glass 105 to form the layered glass assembly 100 is conducted.

Figure 8:
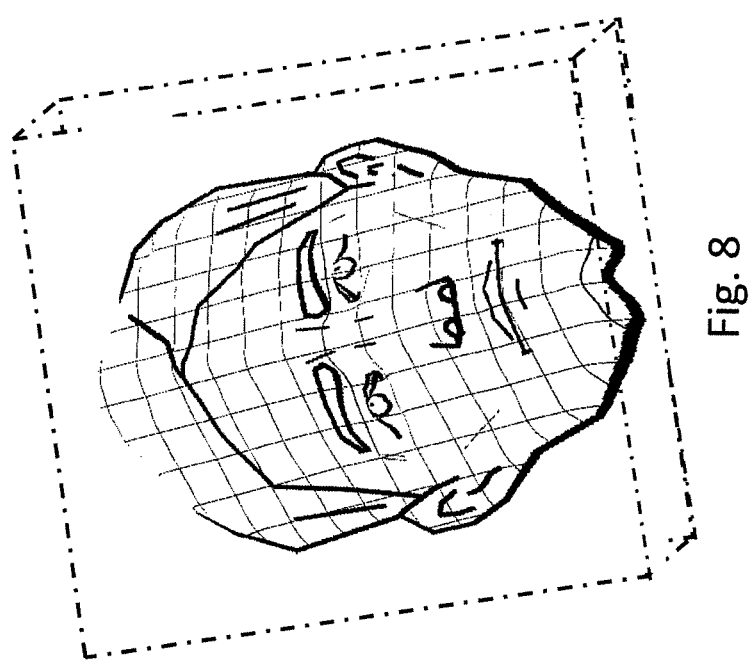
FIG. 8 shows a schematic diagram of optical light beam projection with 3D effects on seamless surfaces according to an exemplary embodiment of the present invention.

FIG. 8 shows a schematic diagram of optical light beam projection with 3D effects on seamless surfaces according to an exemplary embodiment of the present invention.

According to an exemplary embodiment of the present invention, a user interface, for instance in the field of human-machine interaction in a vehicle, in form of a "humanized" user may be used to allow effective operation and control of the machine from the human end, while the machine simultaneously feeds back information that aids the operators decision making process.

The effect is depicted in FIG. 8, where, again, it can be seen that the front surface is still smooth and flat and the three-dimensional human face seems integrated in the bulk of the system.

FIG. 9 shows a schematic diagram of a vehicle according to an exemplary embodiment of the present invention.

An electronic instrument 200 may comprise at least one layered glass assembly 100.

A vehicle 1000 may comprise the electronic instrument 200.

It has to be noted that embodiments of the present invention are described with reference to different subject-matters. In particular, some embodiments are described with reference to method type claims, whereas other embodiments are described with reference to the device type claims. However, a person skilled in the art will gather information from the above and the foregoing description that, unless otherwise notified, in addition to any combination of features belonging to one type of subject-matter also any combination between features relating to different subject-matters is considered to be disclosed within this application.

However, all features can be combined providing synergetic effects that are more than the simple summation of the features.

While the present invention has been illustrated and described in detail in the drawings and foregoing description, such illustration and description are to be considered illustrative or exemplary and not restrictive; the present invention is not limited to the disclosed embodiments.

Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single element or unit may fulfill the functions of several items recited in the claims.

The mere fact that certain measures are recited in mutually different dependent claims does not indicate that a combination of these measures cannot be used to advantage. Any reference signs in the claims should not be construed as limiting the scope.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A layered glass assembly for optical light beam projection with three-dimensional depth perception for a vehicle, the layered glass assembly comprising:
   a display surface glass having a first refractive index and being configured to refract a first section of a light beam at a first interface;
   a first transition structure configured to refract a second section of the light beam at a second interface;
   a filler structure having a second refractive index and being configured to refract a third section of the light beam at a third interface;
   a second transition structure configured to refract a fourth section of the light beam at a fourth interface; and
   a front glass having a third refractive index and being configured to project the refracted light beam so as to generate the three-dimensional depth perception,
   wherein, in the direction from the display surface glass towards the front glass, the layers of the layered glass assembly increase in refractive index until a maximum value in refractive index is reached in the filler structure and, after this maximum value is reached, the layers of the layered glass assembly decrease in refractive index until the front glass is reached, and
   wherein the front glass is shaped with raised or sunken area portions or a relief structure.

2. The layered glass assembly according to claim 1, further comprising a gap arranged between the display surface glass and the front glass, wherein the filler structure is configured to fill the gap.

3. The layered glass assembly according to claim 1, wherein the first optical refractive index of the display surface glass is different from the third optical refractive index of the front glass.

4. The layered glass assembly according to claim 3, wherein the first optical refractive index of the display surface glass differs from the third optical refractive index of the front glass by one selected from the group of 15%, 10%, 5%, and 2%.

5. The layered glass assembly according to claim 1, wherein the second optical refractive index of the filler structure is 1.2 times the first optical refractive index of the display surface glass.

6. The layered glass assembly according to claim 5, wherein the second optical refractive index of the filler structure is one selected from the group of:
   (a) 1.2 times the third optical refractive index of the front glass,
   (b) 1.5 times the third optical refractive index of the front glass,
   (c) 1.7 times the third optical refractive index of the front glass,
   (d) 2 times the third optical refractive index of the front glass, and
   (e) 2.5 times the third optical refractive index of the front glass.

7. The layered glass assembly according to claim 1, wherein the first transition structure comprises a layered structure of at least two layers, wherein the layer adjacent to the display surface glass comprises the lowest refractive index of the layered structure and the layer adjacent to the filler structure comprises the highest refractive index of the layered structure.

8. The layered glass assembly according to claim 1, wherein the second transition structure comprises a layered structure of at least two layers, wherein the layer adjacent to the front glass comprises the lowest refractive index of the layered structure and the layer adjacent to the filler structure comprises the highest refractive index of the layered structure.

9. The layered glass assembly according to claim 1, wherein the layered glass assembly is configured to display information relating to: a speed of the vehicle, an engine rotational speed, a vehicle parameter, or a driving status of the vehicle.

10. An electronic instrument comprising at least one layered glass assembly according to claim 1.

11. A vehicle comprising an electronic instrument according to claim 10.

12. A method for producing a layered glass assembly according to claim 1, the method comprising the steps of:
   providing the display surface glass, the first transition structure, the filler structure, the second transition structure, and the front glass; and
   assembling the display surface glass, the first transition structure, the filler structure, the second transition structure, and the front glass to form the layered glass assembly.

13. The layered glass assembly according to claim 1, wherein the second optical refractive index of the filler structure is one selected from the group of:
   (a) 1.2 times the third optical refractive index of the front glass,
   (b) 1.5 times the third optical refractive index of the front glass,
   (c) 1.7 times the third optical refractive index of the front glass,
   (d) 2 times the third optical refractive index of the front glass, and
   (e) 2.5 times the third optical refractive index of the front glass.

14. A layered glass assembly for optical light beam projection with three-dimensional depth perception for a vehicle, the layered glass assembly comprising:
   a display surface glass having a first refractive index and being configured to refract a first section of a light beam at a first interface;
   a first transition structure configured to refract a second section of the light beam at a second interface;
   a filler structure having a second refractive index and being configured to refract a third section of the light beam at a third interface;
   a second transition structure configured to refract a fourth section of the light beam at a fourth interface; and
   a front glass having a third refractive index and being configured to project the refracted light beam so as to generate the three-dimensional depth perception,
   wherein, in the direction from the display surface glass towards the front glass, the layers of the layered glass assembly increase in refractive index until a maximum value in refractive index is reached in the filler structure and, after this maximum value is reached, the layers of the layered glass assembly decrease in refractive index until the front glass is reached, and
   wherein the display surface glass is shaped with raised or sunken area portions or a relief structure.

15. An electronic instrument comprising at least one layered glass assembly according to claim 14.

16. A vehicle comprising an electronic instrument according to claim 15.

17. A method for producing a layered glass assembly according to claim 14, the method comprising the steps of:
   providing the display surface glass, the first transition structure, the filler structure, the second transition structure, and the front glass; and
   assembling the display surface glass, the first transition structure, the filler structure, the second transition structure, and the front glass to form the layered glass assembly.

* * * * *